Oct. 28, 1952     A. W. SCHLUCHTER     2,615,768
GRID BEARING
Filed April 11, 1947
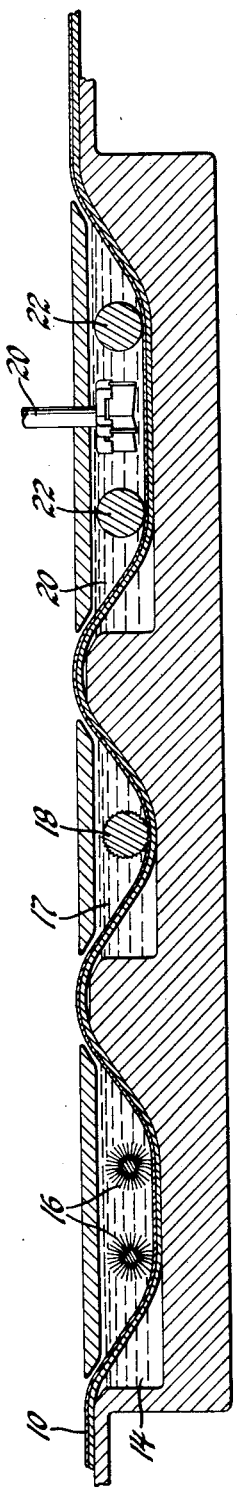
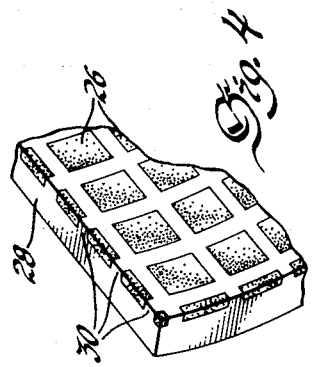
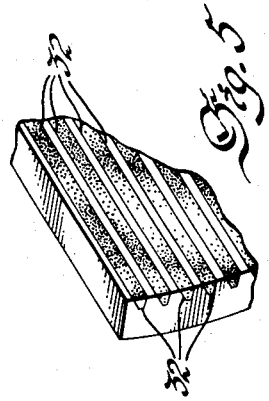
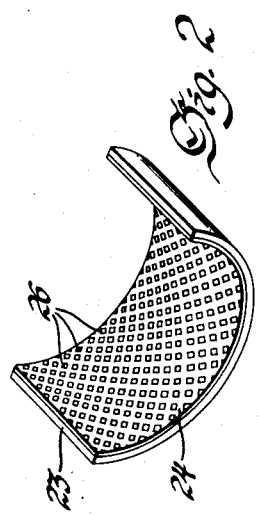
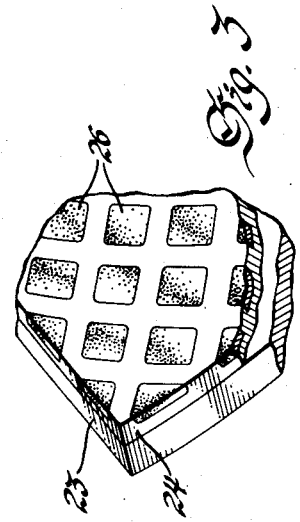
Inventor
Alfred W. Schluchter
By Spencer, Willito, Helwig & Baillio
Attorneys Patented Oct. 28, 1952

2,615,768

UNITED STATES PATENT OFFICE 2,615,768

GRID BEARING

Alfred W. Schluchter, Dearborn, Mich., assignor to General Motors Corporation, Detroit, Mich., a corporation of Delaware Application April 11, 1947, Serial No. 740,782

6 Claims. (Cl. 308—239)

This invention has to do with grid bearings of the type described and claimed in my prior application, Serial No. 342,061, filed June 24, 1940, now abandoned. It also involves, from another point of view and as a feature of general utility, the development of a new and improved corrosion resistant lead base solder for use with aluminum and aluminum alloys.

Grid bearings are characterized by bearing surfaces consisting of a multiplicity of small areas of hard and soft bearing metals arranged in alternating succession circumferentially, and preferably also transversely of the shaft. The hard metal is united with a strong supporting back to enable the bearing to carry heavy loads. This load bearing structure is referred to as the grid or matrix. The areas of soft metal, preferably lead, tin, or lead alloy, are well bonded to the matrix and give the bearing desirable frictional properties as well as embeddability. As pointed out in said prior application, it is necessary, in order to obtain superior performance with this type of bearing, to have the alternating areas of soft bearing metal spaced from each other not more than approximately .070" center to center measured circumferentially of the bearing. While grid bearings of finer pattern will support heavy loads and afford longer life, in the case of the finest patterns, for example, patterns having spacings of .012" or less, manufacture is difficult because the pits or depressions are necessarily quite shallow and impose closer tolerances on machining operations. The grid may have various configurations as disclosed in said prior application. In one form the pits or depressions consist of fine grooves extending transversely of the bearing. In another embodiment the matrix may be provided with projections exposed at the bearing surface to take the load and surrounded by soft bearing metal. A preferred form consists of a matrix having a multiplicity of small circumferentially and transversely spaced pits or depressions.

I have found that pure aluminum is an excellent material from which to make the grid or matrix. It is preferably employed as a coating on a steel back which gives the bearing the desired rigidity. However, in some cases it may be preferable to employ aluminum alloys, particularly Duralumin, having considerable compressive strength. When such alloys are employed the steel back may be dispensed with.

I prefer to employ in the pits or depressions an alloy of lead which is resistant to corrosion. Lead may be rendered resistant to corrosion by the addition of tin and/or antimony. Indium also serves this purpose but is very costly. Bearings of the type herein disclosed are especially subject to corrosion which proceeds inwardly along the bond between the lead alloy and the aluminum and is produced by the effects of the atmosphere, moisture or acid lubricating oils. Antimony seems to be more effective than tin in inhibiting this type of corrosion.

Manufacture of grid bearings with matrices of aluminum or aluminum alloy having pits or depressions filled with lead or lead alloy as described has only been possible after solution of certain vexing problems. As aluminum is subject to rapid oxidation upon exposure to air and is itself a very good deoxidizer, it has proven difficult to obtain a good bond between the aluminum and the lead or lead alloy. I have succeeded in solving this and other difficulties by employing the following method of manufacture.

I first submerge a strip of aluminum, aluminum coated steel or aluminum alloy in a bath of tin or lead or lead-tin alloy. If lead or lead-tin alloy is employed I have found it to be essential to use in the bath a small proportion of a strong deoxidizer, preferably an alkaline earth metal, and, of the alkaline earths, preferably calcium. Calcium is especially desirable because its solubility range in lead is greater than that of aluminum. I have also attempted to use as a deoxidizer alkali metals such as sodium but have found them unsatisfactory because of too much drossing. If a deoxidizer is not employed the surface of the aluminum strip will become oxidized, deriving oxygen from the small amounts of air, moisture, or metallic oxides which may be present in the bath, and a poor bond will result. I prefer to introduce calcium into the bath in the form of lead calcium alloy although it may be introduced as pure metal or as an intermediate alloy if preferred. Where calcium is employed it will be found necessary to replenish it from time to time as it forms a compound with tin which rises to the surface as dross. To minimize the loss of calcium by drossing and at the same time preserve the bond between the lead alloy and the aluminum I have found it best to operate the bath at low temperatures, that is temperatures as close to the freezing point as will permit convenient operation of the bath. It may be found desirable to use a small amount of indium in the bath to reduce oxidation of the calcium.

Where an all tin bath is employed it is not necessary to use a special deoxidizer as the tin will form a good bond with the aluminum and the bond will not be subject to corrosion. While tin will suffice for the initial coating of the strip it will not be found satisfactory for the final filling of the pits or depressions of bearings for use at high speeds and heavy loads where high operating temperatures are involved as it has undesirable frictional properties and a low melting point.

I prefer to employ for this bath either pure tin or an alloy of lead and tin containing at least 30% tin to insure against corrosion. The composition 50% lead and 50% tin is particularly desirable because of its low melting temperature. It is estimated that the amount of calcium that can be held in solution in a lead or lead alloy bath at the low temperatures employed will not exceed from ¼% to ½%. For best results sufficient calcium should be added to the bath from time to time to maintain this proportion.

While the strip is thus submerged in the bath I lightly abrade the aluminum surface preferably by brushing it with a wire brush. Brushing removes some of the oxide coating as well as some of the aluminum or aluminum alloy from the surface of the matrix. The particles of aluminum or aluminum alloy assist in deoxidizing the bath. The cleaning and initial coating of the strip is preferably done in a separate bath to avoid the possibility of particles of aluminum or aluminum oxide becoming embedded in the knurling roller used in the next step of the process and interfering with its operation.

After the strip has thus been given a protective coating of soft metal it is removed from the first bath and, preferably while the coating is still molten, the strip is submerged in a bath of lead-tin alloy of any desired composition as described in connection with the first bath, preferably one containing at least 30% tin to prevent corrosion, and, of course, the same small addition as before of an alkaline earth deoxidizer, preferably calcium. The strip, while submerged, is operated on by a knurling roller which forms pits or depressions in the aluminum surface and also agitates the molten metal to insure replacement of the initial coating by the metal of the second bath. Where the strip consists wholly of aluminum or aluminum alloy the pressure of the knurling roller tends to cause the molten metal to adhere to the back although there is no objectionable adherence where a steel back is used. The preferred lead-tin alloy mentioned above is particularly desirable where the back is of aluminum or aluminum alloy because it has a long freezing range during which adhering metal may be readily removed after the strip is taken from the bath.

The bath is preferably maintained at a temperature of about 535° F., this being sufficiently high to prevent freezing of the metal but sufficiently low so that the bond is preserved and oxidation is reduced. At this temperature the coating of metal on the strip is sufficiently viscous so that it does not readily run off when the strip is removed from the bath. The strip is removed in substantially horizontal position to retain the new coating on the strip and it will be found that this coating forms a strong thermal bond with the metal of the matrix.

The strip is thereafter immersed in a third bath of the alloy desired for the soft metal area of the bearing surface. The bond previously obtained may or may not be wholly dissolved in the third bath. To insure that most of the previous coating is removed from the pits or depressions and replaced by the alloy of the third bath, the blank may be agitated slightly in the bath or the molten metal itself may be agitated by means of a pump or the like.

The composition of the final bath preferably consists of an alloy of lead, tin and antimony in the proportions of from ¼% to 5% antimony, 3% to 20% tin and the balance lead, together with a small amount of calcium. Where high bearing operating temperatures are involved it is preferable to reduce the tin content to from 5% to 10% of the total as tin lowers the melting point of the alloy. The preferred composition is 5% tin, 3% antimony and the balance lead, together with a small amount of calcium to insure a good bond. Calcium forms compounds with both tin and antimony which rise to the surface as dross. It is estimated that the proportion of calcium which can be held in solution in the lead in this bath at the preferred operating temperature of 535° F. is but a few hundredths of 1% but it has been found to be essential in order to obtain a good bond. The lower limit of tin is determined by the minimum amount which will give a substantial degree of resistance to corrosion; the upper limit by the fact that further additions lower the melting point of the alloy so much as to render the bearings unsuitable for use where they are subjected to relatively high operating temperatures. Tin also reduces drossing of the lead. The relatively high lead content improves the frictional properties of the alloy. Antimony greatly improves the resistance of the alloy to corrosion particularly in the region of the bond and also increases the hardness of the alloy.

If desired the third bath may be dispensed with and the above described tin-antimony-calcium-lead alloy may be used in the bath in which the strip is knurled. The advantage of using a separate bath for the knurling operation is that with the antimony omitted much more calcium can be held in solution so that there is greater assurance of obtaining a good bond. However, I have been successful in obtaining a good bond employing as much as 3% antimony in the knurling bath.

It may also be feasible to employ but a single bath, preferably consisting of the above described antimony containing alloy, provided the knurling operation is screened or otherwise protected from particles of aluminum oxide or aluminum resulting from the brushing operation which might lodge in the knurl and interfere with its operation.

It may be found satisfactory in some bearing applications to dispense with antimony in the final bath. In such case on the order of at least 30% tin should be employed in the lead-tin-calcium alloy to provide good resistance to corrosion. However, it is preferable to employ antimony as it is believed to be more effective in protecting the bond from corrosion.

The process above described may be carried out with matrix metal in the form of flat blanks of sufficient size to form one or more bearings. Or the matrix metal may be formed to bearing shape before. However, for large production it will be found preferable to employ the well-known strip process in which a strip of the matrix metal is passed continuously through a bath or baths in which the foregoing operations are performed.

After the matrix metal has been thus knurled and coated with soft bearing metal it is removed from the bath and, if in the form of a strip or multiple blank, is cut to the length desired for the bearing. The bearing blanks are thereafter formed to shape, if this had not been done before coating, and machined to expose the alternate areas of soft bearing metal and metal of the matrix. In some cases it may be preferred not to carry the machining so far and leave a thin overlay of soft bearing metal over the entire bearing surface.

The resulting bearing is characterized by an aluminum or aluminum alloy grid or matrix filled with corrosion-resistant lead alloy united by a corrosion resistant bond to the aluminum surface. The aluminum grid which enables the bearing to carry heavy loads, possesses good bearing properties, and is superior to copper in this respect. The corrosion resistant lead alloy provides good frictional properties and embeddability.

In the drawings I have illustrated diagrammatically suitable apparatus for carrying out my process with the matrix metal in the form of a continuous strip, together with several embodiments of the resulting bearing.

In the drawings:

Figure 1 is a diagrammatic view showing the application of my process to the preparation of a continuous strip of bearing metal;

Figure 2 is a perspective view of one configuration of grid bearing in which my invention may be embodied;

Figure 3 is an enlarged, fragmentary view of a portion of Figure 2; and,

Figures 4 and 5 are views similar to Figure 3 showing modified grid patterns.

Referring to Figure 1, 10 indicates a strip of pure aluminum or aluminum alloy or, preferably, aluminum bonded to a supporting strip of steel. 14 indicates the first bath of molten lead, tin, or lead-tin alloy as described above through which the strip passes as shown in the drawings. At 16 there are illustrated revolving wire brushes which abrade the surface of the strip, thereby exposing a fresh, clean surface of aluminum to contact with the molten metal.

The strip leaving bath 14 passes into the second bath 17 of the composition disclosed above. 18 indicates a revolving knurling roller submerged in the molten metal which gives the desired configuration to the aluminum surface of the strip and at the same time agitates the metal of the bath.

Thereafter the strip passes into a similar bath 20 containing soft bearing metal of the composition described above as desired in the final bearing. 22 indicates rollers which guide the strip and hold it submerged in the bath. In this bath the previous coating is dissolved and to insure that none remains in the pits or depressions, means, such as a suitable pump 29, may be provided to agitate the molten metal.

The aluminum grid or matrix is thus provided with a thermally bonded coating of substantially the same composition as the metal of the bath. Thereafter the composite strip may be formed to bearing shape as shown in Figure 1 and machined until the grid pattern is exposed as shown in Figure 2. The bearing shown in Figures 2 and 3 consists of a steel back 23 having a lining 24, preferably of pure aluminum, knurled to form a multiplicity of pits or depressions 26 which are filled to the level of the surrounding metal by corrosion resistant lead alloy as described.

In the modification shown in Figure 4 the back 28 consists of solid aluminum alloy, preferably Duralumin, which is knurled or otherwise formed to provide a multiplicity of projections 30, the spaces between which are filled with soft bearing metal as described.

In the modification shown in Figure 5 the pits or depressions takes the form of fine grooves 32 extending transversely of the bearing and filled with soft bearing metal.

Bearings made according to this invention, having 48 pits to the linear inch, have been subjected to thorough tests under heavy loads and at high speeds for long periods of time and have shown very little wear. Aluminum possesses advantages over silver, which has previously been used for the matrix metal, because of its much lower cost. Aluminum is superior to copper as a bearing surface and it is believed it will likewise be found more economical to use.

Additional economy may be effected by using Duralumin strip without a steel back as this will make unnecessary the operation of cladding the steep strip with aluminum.

"Aluminum base" as used in the following claims includes both 100% aluminum and alloys having an aluminum base.

I claim:

1. A grid bearing having an aluminum base matrix provided with a bearing surface comprising a multiplicity of small areas of the aluminum base matrix separated circumferentially of the bearing by a multiplicity of small pits containing areas of a corrosion resistant lead alloy thermally bonded to the aluminum base matrix, said corrosion resistant lead alloy containing a small but effective amount of an alkaline earth metal as a deoxidizer, said small but effective amount being not over ½%.

2. A grid bearing having an aluminum base matrix provided with a bearing surface comprising a multiplicity of small areas of the aluminum base matrix separated circumferentially of the bearing by a multiplicity of small pits containing areas of a corrosion resistant lead alloy thermally bonded to the aluminum base matrix, said corrosion resistant lead alloy containing a small but effective amount of calcium as a deoxidizer, said small but effective amount being not over ½%.

3. A grid bearing having an aluminum base matrix provided with a bearing surface comprising a multiplicity of small areas of the aluminum base matrix separated circumferentially of the bearing by a multiplicity of small pits containing areas of a corrosion resistant alloy of lead, tin and antimony thermally bonded to the aluminum base matrix, said corrosion resistant alloy of lead, tin and antimony containing a small but effective amount of an alkaline earth metal as a deoxidizer, said small but effective amount being not over ½%.

4. A grid bearing having an aluminum base matrix provided with a bearing surface comprising a multiplicity of small areas of the aluminum base matrix separated circumferentially of the bearing by a multiplicity of small pits containing areas of a corrosion resistant alloy of lead, tin and antimony thermally bonded to the aluminum base matrix, said corrosion resistant alloy of lead, tin and antimony containing a small but effective amount of calcium as a deoxidizer, said small but effective amount being not over ½%.

5. A grid bearing having an aluminum base matrix provided with a bearing surface comprising a multiplicity of small areas of the metal of the matrix separated circumferentially of the bearing by a multiplicity of small pits containing areas of an alloy consisting of from 3% to 20% tin, from ¼% to 5% antimony, and the balance lead, together with a small but effective amount of calcium as a deoxidizer, said small but effective amount being not over ½%.

6. A grid bearing as in claim 1 in which the aluminum base matrix has a back of strong supporting metal thermally bonded thereto.

ALFRED W. SCHLUCHTER.

REFERENCES CITED

The following references are of record in the file of this patent:

UNITED STATES PATENTS

| Number | Name | Date |
|---|---|---|
| 467,140 | Miller | Jan. 12, 1892 |
| 906,383 | Carroll | Dec. 8, 1908 |
| 1,684,146 | Ripley | Sept. 11, 1928 |
| 2,241,789 | Queneau et al. | May 13, 1941 |
| 2,333,227 | Bagley | Nov. 2, 1943 |
| 2,431,430 | Shaw | Nov. 25, 1947 |

FOREIGN PATENTS

| Number | Country | Date |
|---|---|---|
| 536,414 | Great Britain | May 14, 1941 |